United States Patent [19]
Nicholson

[11] 3,832,463
[45] Aug. 27, 1974

[54] WOOD-TREATMENT COMPOSITIONS CONTAINING HEXAVALENT CHROMIUM

[75] Inventor: James Nicholson, Pontefract, England

[73] Assignee: Hickson's Timber Impregnation Co. (G.B.) Limited, Castleford, Yorkshire, England

[22] Filed: June 2, 1972

[21] Appl. No.: 259,107

Related U.S. Application Data

[63] Continuation of Ser. No. 68,484, Aug. 31, 1970, abandoned, which is a continuation-in-part of Ser. No. 583,089, Sept. 29, 1966, abandoned.

[30] Foreign Application Priority Data
Oct. 6, 1965 Great Britain.................... 42421/65

[52] U.S. Cl................. 424/131, 424/137, 424/358, 106/15 AF, 106/271, 117/150
[51] Int. Cl............................................. A01n 11/00
[58] Field of Search.................... 424/131, 137, 358; 106/15 AF, 271; 117/150

[56] References Cited
UNITED STATES PATENTS
3,376,144  4/1968  Stutz............................... 106/15 AF
3,416,933  12/1968  Nicholson et al............... 106/15 AF

*Primary Examiner*—Vincent D. Turner
*Attorney, Agent, or Firm*—Bacon & Thomas

[57] ABSTRACT

There are provided wax solutions self-dispersible in waterborne wood preservatives containing hexavalent chromium to form stable emulsions. There is also provided a method of preserving wood wherein wood is impregnated with said emulsions. The solutions comprise a hydrocarbon solvent having dissolved therein from 5 to 25 percent by weight of a hydrophobic wax and at least 4 percent by weight of a non-ionic surface active agent having an HLB value between 7 and 11, the surface active agent being a condensate of a long chain fatty alcohol or an alkyl phenol with ethylene oxide.

7 Claims, No Drawings

WOOD-TREATMENT COMPOSITIONS CONTAINING HEXAVALENT CHROMIUM

This application is a continuation of my copending application Ser. No. 68,484 filed Aug. 31, 1970, now abandoned, which is in turn a continuation-in-part of my application Ser. No. 583,089 filed Sept. 29, 1966, and now abandoned.

This invention relates to a self dispersing wax solution for use in a process for the pressure treatment of wood in conjunction with a waterborne preservative.

It is generally acknowledged that one of the most successful ways of achieving resistance to fungal or insect attack is to impregnate the wood by means of a pressure process using a water-borne wood preservative. Such treatments can be made more effective by incorporating into the treatment process an additive which will improve the dimensional stability of the treated wood by imparting a high degree of water repellency.

Among the most effective waterborne preservatives applied by pressure treatments are those based on hexavalent chromium, and generally having a pH of from 1.5 – 8.0, e.g., the copper-chrome-arsenate type such as those which are known commercially as 'Tanalith'C, or CA, Boliden K.33, or 'Celcure A.' This latter type of preservative is normally employed at solution strengths of between 1 and 5 percent, and the treatment solution has a pH between 1.8 and 3.0. After treatment, reduction of hexavalent chromium takes place due to wood extractives, resulting in a rise in pH and the production of an insoluble copper-chrome-arsenate complex within the wood.

While the effectiveness of waterborne preservatives of the chrome-based type are well established, in one aspect of their overall performance, tar oil or certain types of organic solvent-based wood preservatives may claim an advantage over waterborne products by conferring a degree of water repellency. This in turn gives a measure of dimensional stability and weather resistance.

Water repellents have only a slight effect on the rate of absorption of water vapour in timber, but they can be very effective in reducing absorption of liquid water. They have no effect on the equilibrium moisture content of wood. The object of water repellent treatment of wood is to reduce the wettability of the wood surface so that liquid water does not form a coherent film and does not penetrate the surface structure between boards and, particularly up the permeable end grain. The prevention of the absorption of liquid water gives a degree of dimensional stability and prevents rapid swelling and shrinkage during wetting and drying and is also effective in reducing the rate of mechanical degradation due to surface weathering under extreme climatic conditions.

Wax solutions have been used to impart water repellency to cellulosic materials, but the preservatives used for this type of composition are not fixed in the timber, and are inferior to the chrome-based type. Many of these formulations are applied by dip, brush or spray methods, the preservative and water repellents being dissolved in an organic solvent.

It has been discovered that using the self-dispersing wax solutions described in detail hereinafter, low wax concentrations can be used in association with pressure treatment, and also that it is unnecessary in this case to apply heat after treatment to achieve the required degree of water repellency.

The main object of the present invention is to provide a self-dispersing wax solution which can be used freely with all types of waterborne wood preservatives and in particular which is resistant to oxidation by hexavalent chromium solutions at a pH of 1.5 to 8.0.

According to the present invention we provide self-dispersing wax solutions for the preparation of aqueous wood-treatment emulsions, comprising one or more hydrophobic waxes dissolved in a hydrocarbon solvent and a non-ionic surface active agent or a combination of such agents, said agent or combination of agents having an HLB number between 7 and 11 and comprising at least one long chain fatty alcohol ethylene oxide condensate or alkyl phenol ethylene oxide condensate.

In general, it has been found that the purer the wax the higher is its solubility in aliphatic and aromatic solvents. Impure waxes, such as the Slack Waxes and Petroleum Jelly tend to give a thick gel when mixed with such solvents even at relatively low concentrations.

On the other hand, the tendency of pure waxes to crystallise in the wood can be reduced by incorporation of non-crystalline paraffins, including liquid paraffin, petroleum jelly etc. preferably at levels below those causing gel formation. As used herein, the term "liquid paraffin" refers to the oily, non-volatile liquid petrolatum which usually has a density in the range 0.8 – 0.9 at 15°C. as distinct from the less dense hydrocarbons which are used as solvents.

Mixtures of waxes with an aliphatic and an aromatic solvent were prepared in order to determine the solubility of such waxes. It was found that:

1. Slack Waxes gelled above 5 percent concentration.
2. Paraffin Wax (m.pt. 45°) gave a clear solution up to 25 percent concentration.
3. Petroleum Jelly gelled above 15 percent concentration.
4. A mixture of 10 percent paraffin wax, 10 percent liquid paraffin and 2.5 percent petroleum jelly did not gel.

We have found that particularly good results can be achieved by using a paraffin wax of melting point between 40° and 50°C preferably about 45°C., the preferred solvent being an aliphatic petroleum distillate or an aromatic kerosene extract. Thus, for example, a solution containing 5 – 25 parts by weight of paraffin wax, 70 – 90 parts, organic solvent and 5 parts by weight nonionic surface active agent (as above defined) is especially stable and, when added to 'Tanalith' C solution, self disperses with mild agitation giving a dilute emulsion which is free from creaming effects for up to 6 hours. We have also found that homogenisation of the dispersion in 'Tanalith' C solution increases the stability, and that little creaming then occurs for a period of up to 6 weeks and, that the creaming that does occur can be redispersed with ease.

Another particularly good composition contains 10 percent paraffin wax, 10 percent liquid paraffin, 2.5 percent petroleum jelly, surface non-ionic active agent (as above defined) 5 percent, solvent 72.5 percent. This gave over 70 percent water repellancy.

Self dispersing wax solutions were prepared containing 5, 10, 15, 20 and 25 percent paraffin wax (45°) and 5 percent Empilan KB3 (Empilan KB3 is a lauryl alcohol/ethylene oxide condensate - HLB value 8.8). These were diluted with 'Tanalith' C solution and samples were treated according to the American Federal Specification TT-W-572. The water repellencies of the treated samples are summarised in Table 1 below.

| % Wax in Self dispersing wax solution. | Dilution in 'Tanalith' C. | Effective percentage wax in 'Tanalith' C. | Water repellency of treated samples. |
|---|---|---|---|
| 5% | 6% | 0.3% | 47.4% |
|  | 8% | 0.4% | 57.7% |
| 10% | 4% | 0.4% | 64.3% |
| 15% | 3% | 0.45% | 60.8% |
| 20% | 2% | 0.4% | 60.0% |
| 25% | 2% | 0.5% | 57.0% |

A solution of 5 percent surface active agent (Empilan KB3) in petroleum distillate was also prepared, this was self dispersed in 'Tanalith' C solution and used to treat water repellency samples. The water repellency of such samples was found to be −4 percent showing that the water repellent effect achieved is due only to the deposition of wax in the outer cells of the wood.

In general, the concentration of wax in the solutions according to the invention is preferably between 5 and 25 percent by weight and for paraffin wax, the preferred concentration is about 20 percent. Where petroleum jelly is used, this may advantageously be present in the range 1 to 5 percent by weight. Where liquid paraffin is used, it may be present in the range 1 – 15 percent.

The method of testing for the water-repellency of the treated wood is similar to that described in the American Federal Specification TT-W-572 which is now summarised.

This Federal Specification covers the evaluation of timber treated with oil-borne preservatives, in general, pentachlorophenol or copper naphthenate, by non-pressure methods. The procedure employed by us in the evaluation of wood treated with waterborne preservatives incorporating a self-dispersing wax solution was based on this method which may be described as follows:

The specimens are cut from straight grain Scots Pine (*Pinus sylvestris*) sapwood and are ¼ inch sections taken from a piece 1⅛ inches × 1⅝ inches in transverse cross-section, the growth rings running parallel to the 1⅝ inches dimension. Five pairs of specimens are cut, each pair consisting of adjacent sections from the same piece. The samples are conditioned to an equilibrium moisture content of 12 percent. One specimen of each pair is placed in a beaker, the five specimens are weighted down and exposed to a vacuum of 26 inches Hg. for 15 mins. in a vacuum desiccator. The treatment solution is then allowed to flow through a tube leading into the beaker, after which the vacuum is released and the samples are allowed to soak for 30 minutes. The excess liquid is then drained off and the treated specimens are placed in suitable racks to allow free circulation of air until an equilibrium moisture content of 12 percent is attained. Each specimen is then submerged in water at 25°C. for 30 mins. and the swelling in the tangential direction is measured by means of a suitably modified micrometer to the nearest 0.001 inch. The percent water repellency of the treated specimen is then calculated from the following formula:

% water repellency $= [(a - b)/a] \times 100$

Where $a =$ swelling of untreated specimen, and $b =$ swelling of treated specimen.

As indicated above, an important feature of this invention concerns the choice of the dispersing agent. In general, cationic and anionic surface active agents are not stable in solutions of pH values less than 5.0. Non-ionic surface active agents on the other hand, being virtually neutral, are not readily affected by low pH values but for a variety of reasons they are usually not particularly stable or are oxidisable at pH values of less than 3.0. We have found that the non-ionic surface active agents as defined above are not only stable in solutions of pH value between 1.8 and 3.0 but, furthermore, are not oxidised by hexavalent chromium dissolved in these solutions and held at temperatures of about 20°C. A wide range of non-ionic surface active agents have been examined, but only those of the long chain (e.g., 10 – 18 carbon atoms) fatty alcohol-ethylene oxide condensate and long chain (e.g., C 7–11) alkyl phenol-ethylene oxide condensate types having an HLB number within the range 7–11 appear to be effective in causing the wax solution to be self dispersing. Suitable fatty alcohol ethylene oxide condensates include cetyl and lauryl alcohol condensates. The alkyl phenol condensate is preferably an octyl- or nonyl phenol condensate. Both the fatty alcohol- and alkyl phenol-ethylene oxide condensates preferably contain not more than 10 ethylene oxide units. It will be noted that mixtures of non-ionic wetting agents can be used and that in this case, it is the HLB number of the mixture which should be between 7 and 11. The preferred HLB number for the surface active agent or combination of agents is about 9.0.

The concentration of the surface active agent in the solution is preferably at least 4.0 percent by weight advantageously about 5.0 percent. The concentration of surface active agent is also preferably not greater than about 6.0 percent by weight to minimise the cost of the preparation but higher concentrations e.g., up to 8 percent are equally effective.

The solvents used to prepare the wax solution can be either aliphatic or aromatic as previously mentioned; such solvents are available commercially, for example, under the trade names of Esso Distillate, Mobil Distillate and B.P. Extract KEX.

Esso Distillate is an essentially aliphatic petroleum distillate having a boiling range between about 159° and 258°C, a specific gravity at 60/60°F of 0.778, a Flash Point (Abel) of 108°F, a Kauri Butanol value of 31, an aniline point of 67, a total aromatic content of 13 percent by volume and a Saybolt colour of +30.

Mobil Distillate is an essentially aliphatic petroleum distillate having a boiling range between about 160° and 262°C, a Flash Point (Abel) of 116°F and an aromatic content of about 3 percent by volume.

BP Extract KEX is an essentially aromatic petroleum distillate having a boiling range between 171° and 266°C, a specific gravity at 60°F of 0.878, a Saybolt colour of +16, a Flash Point (closed cup) of about 138°F and an aromatic content of 77.8 percent by volume.

It is preferred that the solvents should boil within the range 160°C to 270°C to facilitate evaporation after administration and have a flash point not less than 43°C to reduce inflammability.

The invention also includes emulsions for the treatment of wood comprising a wax solution according to the invention emulsified with an aqueous wood preservative.

The concentration of wax solution in such emulsions is preferably relatively low since we have found that this is advantageous in the pressure impregnation of timber. The concentration is thus preferably between 0.5 and 10 percent by weight, advantageously about 2.0 percent.

The wood preservative is preferably based on hexavalent chromium and may, for example, contain chromic acid or a dichromate e.g., sodium or potassium dichromate and a heavy metal compound e.g., a copper or zinc compound, e.g., the sulphates of these metals, together, if desired, with boric acid or arsenic acid. In general, the wood preservative composition from which the aqueous wood preservative solution is prepared will contain 12.0 percent to 20 percent by weight of hexavalent chromium, 8.0 to 12.0 percent by weight heavy metal, e.g., copper and/or zinc together, if desired, with 6.0 to 23.0 percent by weight of pentavalent arsenic and/or 2.0 to 10 percent by weight of boron, all in the form of appropriate salts, oxides etc. Such a mixture of wood preservative components will normally have a pH in the range 1.8 to 3.0 in solution. This type of composition includes, for example, 'Tanalith' C, Tanalith CA Boliden K33 or Celcure A.

The invention is also applicable to wood preservative compositions of the chrome-fluor-arsenate type (e.g., those based on sodium dichromate, sodium arsenate and sodium fluoride, such as Basilit UAS) and copper-chrome-borate compositions (such as 'Tanalith' CBC). In general the wood preservative composition according to the invention will contain from 1 – 10 percent by weight of wood preservative salts. Wood preservative compositions prepared with the aid of the self-dispersing wax-solutions according to the invention produce particularly good results when used in pressure impregnation systems, e.g., in conventional systems, such as the Full cell, Lowry and Rueping systems.

In contrast to conventional water repellent systems normally consisting of wax solutions in organic solvents, the pressure treatment of timber with a preservative solution containing a dilute self-dispersing wax emulsion according to the invention gives a particularly effective and long lasting degree of water repellency.

While we do not wish to be limited by theoretical explanations we believe the reason for this is that in the case of a conventional water repellent solution a thin continuous film of hydrophobic material is left on the surface of a cellulosic substrate, which while giving good initial water repellency, soon fails as the thin film is broken down by weathering. In the case of the impregnation of timber under pressure with a dilute self-dispersing wax emulsion according to the invention, the hydrophobic material is deposited within the capillary and pore structure of the wood in depth, thus effectivey blocking the pores of the wood against the movement of liquid water giving both a high initial water repellency coupled with greater durability under severe weathering conditions than could be achieved by the deposition of a thin surface film of hydrophobic material by conventional methods.

For the better understanding of the invention the following examples (in which all percentages are by weight) are given by way of illustration only:

Example 1

Samples of Baltic redwood (Pinus sylvestris) 1 × 1.5 × 4.5 inches were pressure treated with a 3 percent solution of 'Tanalith' C incorporating 2 percent self-dispersing wax solution having the following composition.

| | |
|---|---|
| Paraffin wax 45°C | 20% |
| Petroleum distillate | 75% |
| Empilan KB3* | 5% |

'Tanalith' C has the composition:

| | | Elemental content |
|---|---|---|
| $K_2Cr_2O_7$ | 45.0% | Cr. 15.9% |
| $CuSO_4 \cdot 5H_2O$ | 35.0% | Cu. 8.0% |
| $As_2O_5 \cdot 2H_2O$ | 20.0% | As. 11.3% |

*Empilan KB3 is a lauryl alcohol/ethylene oxide condensate HLB value 8.8 and containing three ehtylene oxide units.

The following treatment cycle was employed

| | |
|---|---|
| Vacuum | 15 mins. at 26" Hg. |
| Pressure | 2 hrs. at 150 lb/sq.in. | and an absorption of 3.9 gall/cu.ft. was obtained giving a net dry salt retention of 1.17 lb/cu.ft. and an average wax loading of 0.156 lb/cu.ft. It was confirmed that as a result of this treatment the timber had a water repellency of 60.8 percent.

Example 2

Samples of Redwood (Pinus sylvestris) measuring ¼ × 1⅛ × 1⅝ inches according to the American Federal Specification TT-W-572 were treated with 3 percent solutions of 'Tanalith' C containing 1, 2 and 3 percent of a self-dispersing wax solution having the following composition.

| | |
|---|---|
| Paraffin wax 45°C | 10% |
| Liquid Paraffin | 10% |
| Petroleum Jelly | 2.5% |
| Empilan KB3 (HLB 8.8) | 5% |
| Petroleum Distillate | 72.5 |

The following treatment cycle was employed:

Vacuum – 30 mins. at 26" Hg.
Pressure – 2 hrs. at 200 lb/sq. in.

and an absorption of 4.1 gall/cu.ft. was obtained giving average wax loadings of 0.092, 0.184 and 0.276 lb/cu.ft. The water repellencies of these samples were determined by the A.S.T.M. swellograph method. The following results being obtained:

| % Self-dispersing wax solution | Wax loading | % Water Repellency |
|---|---|---|
| 1 | .092 | 73 |
| 2 | .184 | 74 |
| 3 | .276 | 74 |

Example 3

Two samples of Radiata pine (*Pinus radiata*) ¾ × 6 × 6 inches were prepared from one piece ¾ × 12 × 6 inches. The samples were marked A and B.

A. was treated with a 3 percent 'Tanalith' C solution containing 2 percent self-dispersing additive, B. was retained as an untreated control sample.

The additive had the composition:

| | |
|---|---|
| Paraffin wax 45°C | 12.5% |
| Liquid paraffin | 12.5% |
| Texafor A6. (HLB 9.0)* | 5.0% |
| Petroleum distillate | 70.0% |

*Texafor A6 is a cetyl alcohol/ethylene oxide condensate (6 ethylene oxide units.

The following treatment cycle was employed:

| | |
|---|---|
| Vacuum | 30 mins. at 26" Hg. |
| Pressure | 2 hrs. at 150 lbs/sq.in. | and an absorption of 3.4 gall/cu.ft. was obtained giving an average wax loading of 0.170 lb/cu.ft.

The samples A. and B. were conditioned to an equilibrium moisture content of 12 percent.

A standard drop of water of 0.04 ml. was applied to the surface of both samples. On sample A. the drop height fell 26 percent in 30 mins. calculated from travelling microscope measurements. On sample B. the drop was absorbed completely by the timber in 8 minutes.

Example 4

Samples of Parana pine (*Araucaria angustifolia*) ¾ × 6 × 6 inches were pressure treated by a 3 percent solution of 'Tanalith' C. containing 2 percent self-dispersing additive having the following composition:

| | | |
|---|---|---|
| Paraffin wax 45°C | 10% | |
| Liquid paraffin | 10% | |
| Petroleum Jelly | 2.5% | |
| Ethylan 77 (HLB 10.2)* | 4% | combined |
| Empilan KB1 (HLB 4.0)* | 1% | HLB 9.0 |
| Kerosene extract KEX | 72.5% | |

*Ethylan 77 is an alkyl phenol/ethylene oxide condensate (7 ethylene oxide units) and
Empilan KB1 is a lauryl alcohol/ethylene oxide condensate (1 ethylene oxide unit).

The treatment cycle used was:

| | |
|---|---|
| Vacuum | 30 mins. at 26" Hg. |
| Pressure | 2 hrs. at 150 lbs/sq.in. | and an absorption of 3.7 gall/cu.ft. was obtained giving an average wax loading of 0.166 lb/cu.ft.

Matched samples were left untreated. Both treated and untreated samples were conditioned to 12 percent moisture content and sprayed with water for 1 hour. The untreated control samples picked up, on average, 3.4 times more water than the treated samples.

Example 5

Matched samples of Beech (*Fagus sylvatica*) 12 × 4 × 1 inches were prepared and marked alternatively A. and B. the A samples were pressure treated with a 3 percent solution of Basilit UAS incorporating 2 percent self-dispersing additive having the following composition:

| | |
|---|---|
| Paraffin wax 45°C | 10% |
| Liquid paraffin | 10% |
| Petroleum jelly | 2.5% |
| Texafor A6 (HLB 9.0) | 5% |
| Petroleum distillate | 72.5% |

Basilit UAS has the composition:

| | |
|---|---|
| $Na_2Cr_2O_7$ | 40.0% |
| $Na_2HAsO_4$ | 29.3% |
| $NaHF_2$ | 22.0% |
| NaF | 8.7% |
| pH 3.0–5.0 | |

The following treatment cycle was employed:

| | |
|---|---|
| Vacuum | 30 mins. at 26" Hg. |
| Pressure | 2 hrs. at 180 lb/sq.in. | and an absorption of 3.05 gall/cu.ft. was obtained, giving an average wax loading of 0.137 lb/cu.ft.

The B samples were retained as untreated control samples. All samples were conditioned to 12 percent moisture content.

The samples were then attached to a weathering device arranged such that in a cycle of 6 hours each sample experienced:

a. a complete soaking from water jets
b. a partial drying from a current of air
c. exposure to heat, giving a surface temperature of 75°–90°C, by a radiant heater and reflector
d. exposure to ultra violet radiation.

After 20 days of such exposure the samples were removed and examined. The treated A samples showed no degradation, the untreated B samples showed extensive twisting, warping, splitting and checking in all cases.

Example 6

Matched samples of Western Hemlock (*Tsuga heterophylla*) 12 × 4 × 1 inches were prepared and marked alternately A. and B.

The A samples were pressure treated with a 3 percent solution of Boliden K.33 containing 2 percent of self-dispersing additive having the composition:

| | | |
|---|---|---|
| Paraffin wax m.pt. 45°C | 10% | |
| Liquid paraffin | 10% | |
| Petroleum jelly | 2.5% | |
| Lubrol MOA. (HLB 6.0)* | 2.5% | combined |
| Ethylan CP. (HLB 12.9)* | 2.5% | HLB 9.5 |
| Petroleum distillate | 72.5% | |

*Lubrol MOA is a fatty alcohol/ethylene oxide condensate (on average 2.5 ethylene oxide units) and
Ethylan CP is an octyl phenol/ethylene oxide condensate (8 ethylene oxide units).

Boliden K.33 has the composition:

| | |
|---|---|
| CrO₃ | 26.6% |
| CuO | 14.8% |
| As₂O₅2H₂O | 34.0% |
| Water | 24.6% |
| pH 1.5–3.0 | |

The following treatment cycle was employed:

| | |
|---|---|
| Vacuum | — 30 mins. at 26" Hg. |
| Pressure | — 2 hrs. at 200 lb/sq.in. | and an absorption of 2.70 gall/cu.ft. was obtained giving an average wax loading of 0.122 lb/cu.ft.

The B samples were retained as untreated controls.

The samples were conditioned to a moisture content of 12 percent and exposed on the weathering device described in Example 5. After 20 days exposure the treated A samples showed no climatic degradation, the untreated B samples showed excessive splitting and checking.

Example 7

Two samples of Rimu (*Dacrydium cupressinum*) ¾ × 6 × 6 inches were prepared from one piece ¾ × 6 × 12 inches and marked A and B. Sample A was pressure treated with a 3 percent 'Tanalith' C solution containing 2 percent of a self-dispersing additive having the composition:

| | |
|---|---|
| Paraffin wax 45°C | 10% |
| Liquid paraffin | 10% |
| Petroleum Jelly | 2.5% |
| Ethylan 77 (HLB 10.2) | 2.5% } combined |
| Ethylan 171 (HLB 6.4)* | 2.5% } HLB 8.4 |
| Kerosene Extract KEX | 72.5% |

*Ethylan 171 is a fatty alcohol/ethylene oxide condensate (3 ethylene oxide units).

The following treatment cycle was employed:

| | |
|---|---|
| Vacuum | — 30 mins. at 26" Hg. |
| Pressure | — 2 hrs. at 200 lb/sq.in. | and an absorption of 2.7 gall/cu.ft. was obtained giving an average wax loading of 0.121 lb/cu.ft.

Sample B. was retained as a matched control sample.

Both samples were conditioned to 12 percent moisture content and exposed to a water spray for 1 hour.

The untreated control sample picked up 4.1 times more water than the treated sample.

Example 8

Three samples of Beech (*Fagus sylvatica*) measuring 1 × 6 × 6 inches were treated with a 3 percent solution of 'Tanalith' C containing 2 percent of a self-dispersing wax solution of the composition:

| | |
|---|---|
| Paraffin wax | 10% |
| Liquid paraffin | 10% |
| Empilan N.P.4 (HLB 9.0)* | 5% |
| Kerosene Extract KEX | 75% |

*Empilan N.P.4 is a nonyl phenol/ethylene oxide condensate containing 4 ethylene oxide units.

The following treatment cycle was employed:

| | |
|---|---|
| Vacuum | — 30 mins. at 26" Hg. |
| Pressure | — 2 hrs. at 200 lb/sq.in. | and an absorption of 3.2 gall/cu.ft. was obtained giving an average wax loading of 0.160 lb/cu.ft.

Three matched samples were untreated.

All samples were immersed in water for 30 minutes. The untreated controls picked up 4.4 times more water than the treated samples.

I claim:

1. A wood preservative composition comprising a waterborne wood preservative containing a wood preserving amount of hexavalent chromium having dispersed therein to form a stable emulsion, a solution in a hydrocarbon solvent boiling within the range of 160°–270°C of from 5 to 25 percent by weight of paraffin wax and 4 to 8 percent by weight of a surface active material selected from the group consisting of a non-ionic surface active agent having an HLB value between 7 and 11 and a mixture of non-ionic surface active agents having a resultant HLB value between 7 and 11, each said surface active agent being a condensate of at least one member selected from the group consisting of a long chain fatty alcohol of 10 to 18 carbon atoms and an alkyl phenol of 7 to 11 carbon atoms in the alkyl radical with ethylene oxide, at least one surface active agent in said solution containing no more than 10 ethylene oxide units, said composition containing from 0.5 to 10 percent by weight of said solution.

2. The wood preservative composition as claimed in claim 1 in which said waterborne preservative has a pH in the range of 1.8 to 3.0.

3. A wax solution self-dispersible in a waterborne wood preservative containing a wood preserving amount of hexavalent chromium to form a stable emulsion, comprising a solution in a hydrocarbon solvent boiling within the range of 160° – 270°C of from 5 to 25 percent by weight of paraffin wax and 4 to 8 percent by weight of a surface active material selected from the group consisting of a non-ionic surface active agent having an HLB value between 7 and 11 and a mixture of non-ionic surface active agents having a resultant HLB value between 7 and 11, each said surface active agent being a condensate of at least one member selected from the group consisting of a long chain fatty alcohol of 10 to 18 carbon atoms and an alkyl phenol of 7 to 11 carbon atoms in the alkyl radical with ethylene oxide, at least one surface active agent in said solution containing no more than 10 ethylene oxide units.

4. The wax solution as claimed in claim 3 wherein said paraffin wax is paraffin wax melting between 40° and 50°C.

5. The wax solution as claimed in claim 3 in which said solution contains in addition to said paraffin wax to reduce its tendency to crystallise, a non-crystalline paraffin selected from the group consisting of petroleum jelly and liquid paraffin, said petroleum jelly being present within the range of 1 to 5 percent by weight and said liquid paraffin being present within the range of 1 to 15 percent by weight.

6. The wax solution as claimed in claim 3 in which the HLB value of said single surface active agent or of said mixture of surface active agents is about 9.

7. A wax solution self-dispersible in a waterborne wood preservative containing a wood preserving amount of hexavalent chromium to form a stable emulsion, comprising a solution in a hydrocarbon solvent boiling within the range of 160° – 270°C of from 5 to 25 percent by weight of paraffin wax melting between 40°C and 50°C, from 1 – 5 percent by weight of petroleum jelly, from 1 – 15 percent by weight of liquid paraffin and 4 to 8 percent by weight of a surface active material selected from the group consisting of a non-ionic surface active agent having an HLB value between 7 and 11 and a mixture of non-ionic surface active agents having a resultant HLB value between 7 and 11, each said surface active agent being a condensate of at least one member selected from the group consisting of a long chain fatty alcohol of 10 to 18 carbon atoms and an alkyl phenol of 7 to 11 carbon atoms in the alkyl radical with ethylene oxide, at least one surface active agent in said solution containing no more than 10 ethylene oxide units.

* * * * *